E. L. KEESLING.
CONVERTIBLE WHEEL.
APPLICATION FILED FEB. 28, 1919.
1,350,813.
Patented Aug. 24, 1920.
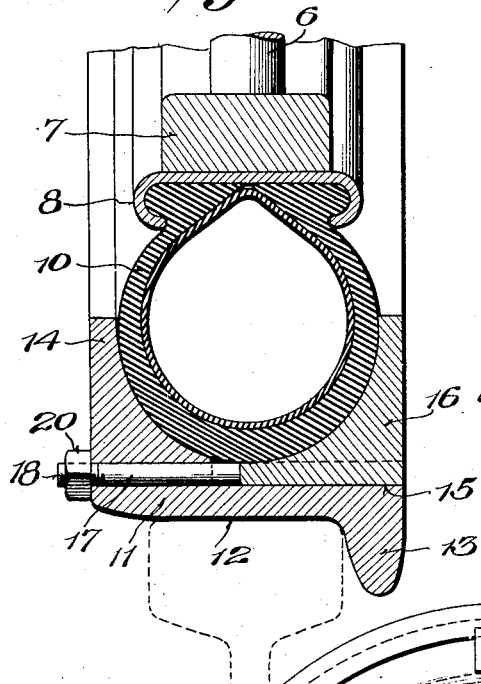
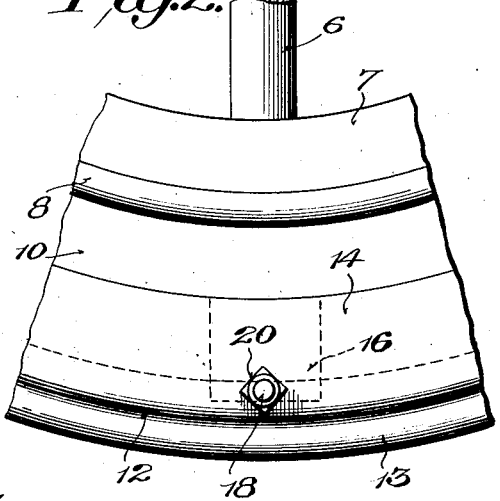
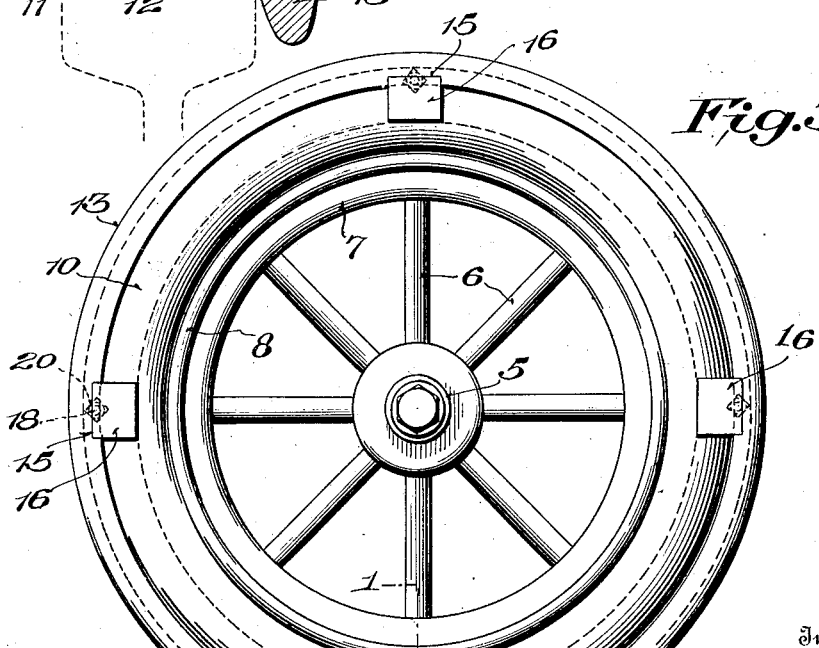

UNITED STATES PATENT OFFICE.

ERNEST LISLE KEESLING, OF SAN JOSE, CALIFORNIA.

CONVERTIBLE WHEEL.

1,350,813.  Specification of Letters Patent.  Patented Aug. 24, 1920.

Application filed February 28, 1919. Serial No. 279,740.

*To all whom it may concern:*

Be it known that I, ERNEST LISLE KEESLING, a citizen of the United States of America, residing at San Jose, in the county of Santa Clara and State of California, have invented certain new and useful Improvements in Convertible Wheels, of which the following is a specification.

This invention relates to improvements in convertible wheels and particularly that type whereby the vehicle may travel on the roadway or on the railway as desired.

It frequently happens, especially in agricultural districts that motor trucks and trailers are loaded with produce on the farm which is carried to the railroad station and then reloaded in cars. It is desired that the trouble of reloading the produce from the trucks to the railway and the loss and damage incident thereto be avoided and this is done by substituting flanged rims over the usual tires, of such shape as to permit the vehicle to travel on rails regardless of switches, crossovers and the like.

It is one of the objects of the present invention to provide a simple and practicable convertible rim which may be easily and quickly applied to the rubber tires of vehicles whereby the vehicles may be used on railroads. A further object is to provide a convertible rim of the above character which will be inexpensive to manufacture, reliable and efficient in use and easy to apply. With these and other objects in view attention is called to the accompanying sheet of drawing wherein is shown one of the various possible modifications of the present invention, and in which similar reference characters denote corresponding parts. In this drawing:

Figure 1 is a transverse section through the wheel rim;

Fig. 2 is a detail fragmentary view of one side of the wheel;

Fig. 3 is an inside elevational view of the wheel from the opposite side of Fig. 2.

Referring now to the drawings in detail, 5 denotes a hub of a wheel of any desired type provided with the usual spokes 6 and rim 7 to which is applied in the present instance a clencher rim 8 adapted to engage with a pneumatic tire 10 in the usual manner. All of these parts are of well known construction and require no detailed showing or explanation. It might be noted, however, that these parts vary according to the tires used and where a solid tire with a general rectangular cross section is employed the shape of the convertible rim is shaped to conform thereto.

This convertible rim as herein shown, comprises a member 11 having a tread portion 12 adapted to travel on the rail of a track, as indicated by the dotted lines and is provided at one side with a flange 13 adapted to prevent the wheel from leaving the track and an oppositely extending tire engaging flange 14 more or less closely conforming to the shape of the tire 10. At a plurality of points about this rim are grooves 15 extending inwardly toward the flange 14 and adapted to receive clamping members 16, these members being of general L-shape construction with the inner or angular portion shaped according to the cross section of the tire 10 and provided with a shank 17 adapted to slide in the groove 15 and the continuing hole in the flange 14 when the parts are being assembled. The end of this shank is threaded as at 18 to receive a nut 20 which may be of the locknut type, if desired. Any suitable form of fastening means may be employed for holding the parts 14 and 16 in close engagement with the opposite sides of the tire 10. The form herein shown, however, is deemed preferable, inasmuch as it is easily adjustable to different sizes of tire or to the same tire as it becomes worn.

In operation, or application, the vehicle is jacked up in the usual manner and the member 11 slipped over the surface of the tire with the flange 13 on the inside. The clamping members 16 are then inserted in the grooves 15 and the nuts 20 applied thereby to bring the parts 14 and 16 into close gripping relation with the opposite sides of the tire. After the four wheels of the vehicle are supplied with convertible rims of this character, the vehicle may run up onto the track.

As is customary, in employing convertible rims of this character on road vehicles, the steering mechanism is locked in straight ahead position in any desired manner for the curves of the railroad are upon such a large angle the vehicle will easily take the same without shifting the position of the steering mechanism.

It is thus seen that the present invention provides a simple and practical convertible rim applicable to motor vehicles and one which may be easily applied. It is noted particularly that the present device, involves very few parts which are inexpensive to manufacture, and so closely resembles the tread of the usual railroad vehicle wheel that the same will easily take the curves of the railroad as well as the crossovers and switches without danger of derailment.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:—

1. A convertible rim comprising a member having a tread portion with oppositely extending flanges, one being adapted to engage the rail and the other curved in cross-section to conform to and engage the side of a tire of a vehicle, and a plurality of separate curved clamping members adapted to engage the other side of the tire at spaced intervals with adjustable securing means whereby the tire may be clamped between said tire engaging flange and clamping members.

2. A convertible rim comprising a member having a tread portion and oppositely extending flanges, one of which is adapted to engage the side of a tire of the vehicle, a plurality of members of generally L-shaped cross-section adapted to engage the other side of the tire at intervals to clamp the tire between said members and said flange, and adjusting means whereby the rim may be applied to tires of different sizes.

3. A convertible rim comprising a member having a tread portion, a rail engaging flange and an oppositely extending tire engaging flange, said tread portion having a plurality of grooves, and clamping members adapted to move longitudinally in said grooves and engage the opposite side of said tire at intervals whereby the tire is clamped between said clamping members and said tire engaging flange.

4. A convertible rim comprising a member having a tread portion and oppositely extending flanges, one of which is adapted to engage the side of a tire of the vehicle, a plurality of clamping members adapted to engage the other side of the tire at spaced intervals to clamp the tire between said spaced member and said flange, and fastening means connecting said clamping members with said tire engaging flange.

In testimony whereof I affix my signature.

ERNEST LISLE KEESLING.